UNITED STATES PATENT OFFICE.

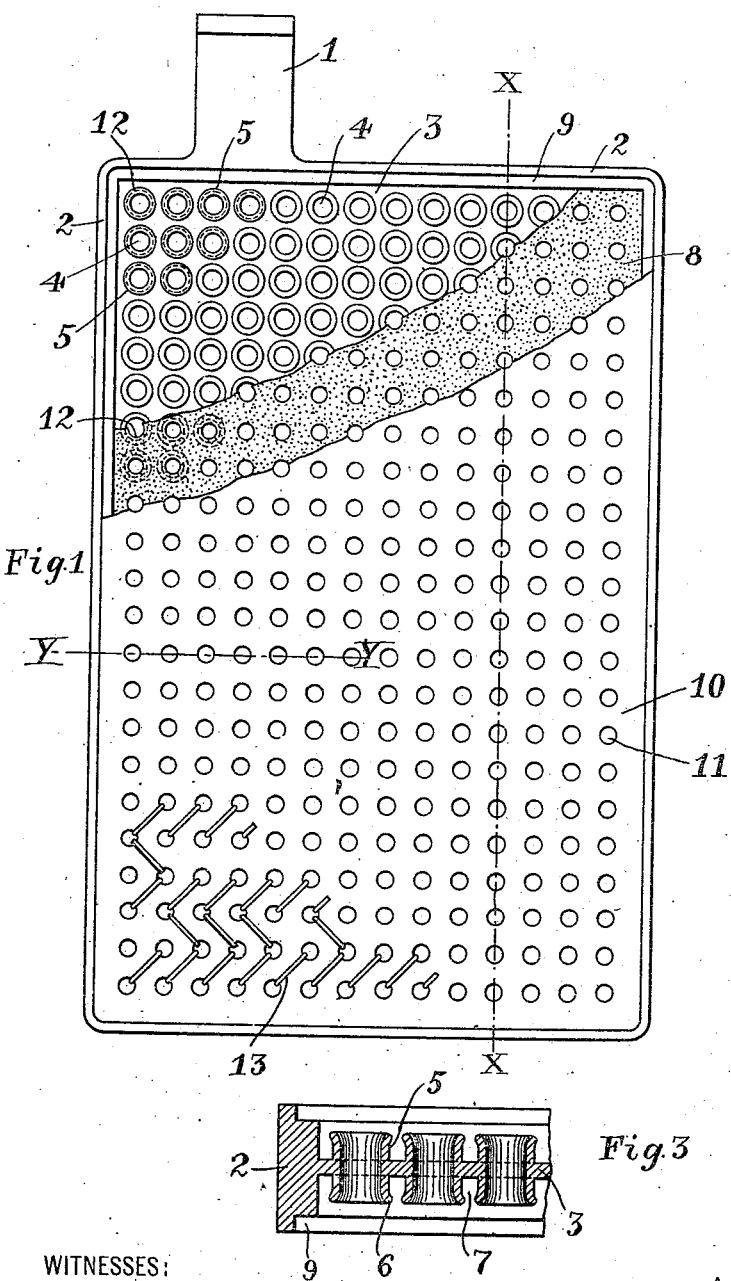

CHARLES BUSCH, OF NEW YORK, N. Y.

SECONDARY-BATTERY PLATE.

968,119.　　　　Specification of Letters Patent.　Patented Aug. 23, 1910.

Application filed October 27, 1909. Serial No. 524,861.

*To all whom it may concern:*

Be it known that I, CHARLES BUSCH, citizen of the United States, residing at 611 East One Hundred and Eighty-first street, Bronx, New York city, New York, have invented certain new and useful Improvements in Secondary-Battery Plates, of which the following is a specification.

My invention relates to electric storage batteries, or accumulators.

It relates particularly to the type of accumulators in which the active material is prevented by an envelop, preferably of non-conducting material, from dropping out of the grid and short-circuiting the plates.

The invention constitutes an improvement on my United States Patent No. 901,322, dated October 20, 1908; but from which it differs in several important respects which are to be hereinafter set forth.

The object of my invention is to provide a plate, which, while economically constructed, shall present a large surface of active material to the exciting fluid, shall securely lock the active material to the plate, shall prevent short-circuiting, and while presenting the minimum amount of weight, shall possess a maximum of strength and rigidity.

To carry out my invention, I provide a plate having a body portion extensively perforated, the perforations extending beyond the general surface of the plate on both sides in the shape of bosses, the walls of which are thin, in order to utilize to the utmost extent the inner surface of the hollow bosses. I make these hollow bosses with slightly outwardly turned circular rims, in order that, when bent inwardly they may hold the active material lining the inner walls of the perforation, and leaving a passage for free excess of the exciting fluid. For the purpose of connecting the plate with the electric circuit, I provide it with a lug, preferably cast, integral therewith, and for strength and rigidity I form it at the edges with a reinforcing frame provided with a groove running entirely around it on both sides, and adapted to receive flush with itself an envelop, preferably non-conducting, perforated so that its perforations coincide and form one channel with those of the bosses.

In the drawings accompanying this application, and forming a part thereof, Figure 1 is an elevation of the complete plate, partly in section; Fig. 2, a vertical cross-section on the line $x$—$x$, of Fig. 1, and Fig. 3 is an enlarged detail section on line $y$—$y$, of Fig. 2, showing particularly the shape of the frame and the bosses.

Referring to the drawing; 1 is the conducting lug, preferably integral with the frame and with the grid proper. In the grid 3 there are fashioned perforations 4, arranged as closely together as is consistent with strength and rigidity. These perforations are made in bosses 5 extending outwardly on both sides of the grid 3, and have expanding rims 6, which serve to lock securely the active material 8, within the spaces 7 between the adjacent bosses. These bosses may be cast hollow at the time of casting the grid, or they may be cast solid and then perforated. As will be hereinafter explained, the perforations greatly extend the surface of the active material 8. Adapted to fit within the groove 9 of the frame 2 is a sheet of material 10 preferably insulating, of a thickness practically equal to that of the recess 9 of the frame 2. This enveloping plate 10 is provided with perforations 11 exactly registering with the grid perforations 4, and of a diameter slightly less than that of the perforations as cast. This envelop, as in my United States Patent No. 901322, is held in close and binding contact with the plate by a cord 13, passing through the perforations of both the plate and the envelop.

To form my plate, I take the grid cast with its perforated bosses, and cover the grid and fill the perforations of the bosses with active material. I then, as one manner of working, apply the perforated sheet 10 to the frame 2, its edges resting within the groove 9 entirely around the frame, and with a proper punch, of practically the same diameter as that of the sheet perforations, I remove most of the active material held within the bosses 5. This results in leaving the inner walls of the boss perforations coated with a thin and closely adhering layer of active material, as indicated by the dotted lines 12, of Fig. 1. The result of this operation is to add to the already greatly extended surface of active material on the grid proper, the enormous surface presented by the inner surfaces of the perforations as a whole.

To complete the plate ready for receiving the charge, it is only necessary to bind the envelop to the grid, and this is done as mentioned above, by the cord, 13, preferably of elastic material, extending from side to side through the perforations of the grid and envelop.

Having thus fully described and illustrated my invention, what I claim is:

In a secondary battery plate, a grid provided with perforated bosses extending laterally on both sides thereof, a heavy frame integral with the grid and provided with an encircling groove, active material covering the grid and lining the inner surface of the bosses and covering the ends thereof, in combination with a thin sheet fitting with its edges into the frame groove, and having perforations registering with those of the bosses, the bosses only extending part of the distance between the thin sheets, and having active material between the ends of the bosses and the thin sheets, substantially as set forth.

In testimony whereof, I have signed my name to this specification in the presence of two subscribing witnesses, this 14th day of October 1909.

CHARLES BUSCH.

Witnesses:
A. STETSON,
F. H. LOGAN.